United States Patent Office 3,084,151
Patented Apr. 2, 1963

3,084,151
WATER-INSOLUBLE METALLIFEROUS AZO-DYE-
STUFFS AND PROCESS FOR PREPARING THEM
Richard Gross, Frankfurt am Main, and Hasso Hertel,
Werner Kirst, Reinhard Mohr, and Walter Staab, Offenbach (Main), Germany, assignors to Farbwerke Hoechst
Aktiengesellschaft vormals Meister Lucius & Brüning,
Frankfurt am Main, Germany, a corporation of Germany
No Drawing. Filed Sept. 7, 1960, Ser. No. 54,360
Claims priority, application Germany Sept. 9, 1959
6 Claims. (Cl. 260—146)

The present invention relates to new water-insoluble metalliferous azo-dyestuffs and to a process for preparing them; more particularly it relates to water-insoluble complex metal compounds of azo-dyestuffs corresponding to the following general formula

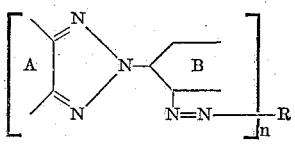

wherein A and B represent radicals of the benzene or naphthalene series, R represents the radical of a coupling component coupling in a position vicinal to a hydroxyl group, especially a radical of an arylide of an aromatic or heterocyclic ortho-hydroxycarboxylic acid or an acylacetic acid and $n$ stands for the integer 1 or 2.

We have found that new water-insoluble metalliferous azo-dyestuffs are obtained by coupling in substance, on the fiber or on another substratum the diazonium compounds of amines corresponding to the general formula

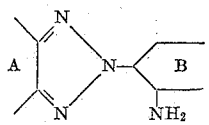

wherein A and B represent radicals of the benzene or naphthalene series, with coupling components coupling in a position vicinal to a hydroxyl group, especially with arylides of aromatic or heterocyclic ortho-hydroxycarboxylic acids or of acylacetic acids, the dyestuff components being free from groups imparting solubility in water such, for example, as sulfonic acid or carboxylic acid groups, and treating the dyestuffs so obtained with agents yielding metal.

The treatment of the water-insoluble azo-dyestuffs obtainable according to the process of this invention with the agents yielding metal may be carried out by known methods during or after the coupling in substance or on the fiber. When the dyestuffs are produced on the fiber, the metallization may be effected by adding the agents yielding metal to the developing bath or by adding these compounds to the impregnation bath. The treatment of the dyestuffs with agents yielding metal after the coupling may be carried out in a second bath which is neutral, weakly alkaline or weakly acid and contains, if desired, dispersing agents and detergents, such as, for example, fatty alcohol polyglycol ether, alkylphenol polyglycol ether, alkylnaphthol polyglycol ether, fatty acid polyglycol ester or fatty acid amide polyglycol ether.

As agents yielding metal, there are preferably used for the process of the present invention compounds yielding copper, cobalt or nickel which may be used in the form of their inorganic or organic salts such, for example, as chlorides, bromides, sulfates, nitrates, formates or acetates, or as complex compounds, especially with hydroxyalklyamines, such, for example, as triethanolamine or diethanolamine, with amino acids such as amino-acetic acid or nitrilotriacetic acid, with hydroxy-carboxylic acids, such as citric acid or tartaric acid, or with alkali metal phosphates, such, for example, as alkali pyrophosphates or alkali polyphosphates. When there is used an agent yielding cobalt, the addition of compounds of hexavalent chromium or other oxidizing agents, for example alkali metal perborates or alkali metal persulfates, has an advantageous effect on the metallization. On vegetable fibers, including fibers of regenerated cellulose, there are obtained by the dyeing and printing methods known from the ice color industry dyestuffs which possess in addition to good general properties of fastness a very good fastness to light.

The production of the dyestuffs on vegetable fibers may be carried out at a long goods-to-liquor ratio. Piece goods, warps or bands may be dyed in a continuous manner, or printed by the base or naphtholate printing process.

Vegetable fibers, including fibers of regenerated cellulose, may for instance be impregnated with the alkaline solutions of the coupling components which, in most cases, are not substantive or only little substantive, and freed from the excess by squeezing or centrifuging. After an eventual intermediate drying of the impregnated material, the formation of the dyestuff may be effected as usual in a developing bath containing the diazonium compound of one of the amines used according to the process of the present invention.

The new dyestuffs can also be prepared on animal fibers such as wool or silk, or on synthetic fibers such as polyamide, acetylcellulose, or polyvinylalcohol fibers, by the dyeing processes usual for these fibers whereby valuable dyeing processing good properties of fastness are obtained.

The dyestuffs can also be prepared in substance and converted into complex metal compounds by a treatment with agents yielding metal. The metallization may be carried out in an aqueous suspension or in an organic solvent, such, for example, as acetone or dimethylformamide. The complex metal compounds so obtained are suitable for dying animal and synthetic fibers, or for coloring organic plastic masses of high molecular weight.

As coupling components for the process of the present invention there may be used compounds coupling in a position vicinal to a hydroxyl group i.e. aromatic or heterocyclic hydroxy compounds as well as compounds containing an enolizable or enolized ketomethylene group.

Such compounds are, for example, arylides of aromatic or heterocyclic ortho-hydroxycarboxylic acids or acylacetic acids, such as arylides of 2,3-hydroxynaphthoic acid and its derivatives substituted in 6-position or arylides of 2-hydroxyanthracene-3-carboxylic acid, 3-hydroxydiphenylene oxide-2-carboxylic acid, 2-hydroxycarbazole-3-carboxylic acid, 5-hydroxy-1,2,1',2'-benzocarbazole-4-carboxylic acid, acetoacetic acid, benzoylacetic acid or terephthaloyl-bis-acetic acid, furthermore the derivatives of phenol substituted in 4-position, such as para-cresol, para-chlorophenol, 4-hydroxy-1,2-xylene, 4-hydroxyacetophenone and hydroquinonemonomethylether, the derivatives of α-naphthol substituted in 4-position such as, for example, 4-chloro-1-naphthol, 4-methoxy-1-naphthol and 4-benzoyl-1-naphthol, β-naphthol and its derivatives, such, for example, as 6-bromo-2-naphthol, 7-hydroxy-2-methoxynaphthalene, 1-benzoylamino-7-naphthol and 4-phenylazo-1-amino-7-naphthol, as well as 6-hydroxyquinoline, 2-hydroxycarbazole, 3-hydroxydiphenylene oxide and 1-aryl-3-methyl-5-pyrazolone. In addition to these monohydroxy compounds there can also be used as coupling components polyhydroxy compounds of the aromatic or heterocyclic series coupling in ortho-position to the hydroxyl groups, for example resorcinol, benzoylresorcinol, terephthaloyl - bis - resorcinol, 2,6 - dihydroxynaphthalene and 3,6-dihydroxydiphenylene oxide.

As amino compounds which correspond to the above formula and may advantageously be used for the process of the present invention, there may be used compounds wherein the benzene or naphthalene radicals A and B may be substituted by groups which do not impart solubility in water such, for example, as halogen atoms, alkyl, alkoxy, trifluoromethyl, acylamino, sulfonic acid amide, or carboxylic acid amide groups.

These amino compounds may be prepared in a manner such that 2-(2'-aminoaryl)-4,5-arylene-1,2,3-triazole-1 oxides corresponding to the general formula

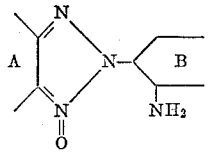

wherein A and B represent radicals of the benzene or naphthalene series, are treated in an alcoholic solution or suspension, at a temperature ranging from about 30° C. to about 150° C., preferably from about 60° C. to about 100° C., and a pressure ranging from about 5 to about 150 atmospheres gage, preferably from about 10 to about 60 atmospheres gage, with hydrogen in the presence of Raney catalysts, such, for example, as Raney nickel.

The following examples serve to illustrate the invention but they are not intended to limit it thereto; the parts being by weight unless otherwise stated and the relationship of parts by weight to parts by volume being the same as that of the kilogram to the liter.

EXAMPLE 1

Cotton yarn is treated for 45 minutes at 35° C., at a goods-to-liquor ratio of 1:20, in the following impregnation bath, centrifuged, and developed first for 10 minutes at 20° C., and then, after being slowly heated to 90° C. to 95° C., for 20 to 30 minutes at 90° C. to 95° C. in the developing bath. The yarn is then rinsed with a solution containing per liter of water 3 cc. of hydrochloric acid of 20° Bé., soaped first for 15 minutes at 60° C., then for 15 minutes at 95° C., with a solution containing, per liter of water, 1 gram of a reaction product from about 10 mols of ethylene oxide and 1 mol of isododecyl phenol and 3 grams of calcined sodium carbonate, rinsed and dried.

*Impregnation Bath*

3.5 grams of 1-(2',3'-hydroxynaphtholyamino)-naphthalene are dissolved in
7 cc. of denatured ethyl alcohol,
1.75 cc. of sodium hydroxide solution of 38° Bé.,
3.5 cc. of hot water, and
1.75 cc. of a formaldehyde solution of 30% strength. The solution so obtained is then made up to 1 liter with water of 35° C.,
3 grams of a condensation product of fatty acids of high molecular weight and protein degradation products, and
10 cc. of sodium hydroxide solution of 38° Bé.

*Developing Bath*

3 grams of 2-(2'-amino-4'-methoxy-5'-acetylaminophenyl)-6-methylbenztriazole in the form of a diazonium compound prepared in the usual manner are dissolved in
1 liter of water containing
2 grams of a reaction product from about 20 mols of ethylene oxide and 1 mol of octadecyl alcohol,
3 cc. of acetic acid of 50% strength,
10 grams of sodium acetate, and
2.5 grams of copper sulfate.

A fast currant dyeing of good properties of fastness is obtained.

When in the above example 2.4 grams of cobaltous chloride or 2.8 grams of nickel sulfate are used instead of 2.5 grams of copper sulfate, a red-brown dyeing is obtained.

EXAMPLE 2

Cotton fabric is padded on the foulard with the following solution and dried:

6.4 grams of 2,3-hydroxynaphthoylaminobenzene are dissolved with
15 cc. of sodium hydroxide solution of 38° Bé.,
20 grams of Monopole Brilliant Oil and
50 cc. of water of 80° C. and made up to 1 liter with boiling water.

The dried fabric is developed on the foulard with a solution containing, per liter of water, 10 grams of 2-(2'-amino-4',5'-diethoxyphenyl)-6-methoxybenztriazole in the form of a diazonium compound prepared in the usual manner,
2 grams of a reaction product from about 20 mols of ethylene oxide and 1 mol of octadecyl alcohol, and
10 cc. of acetic acid of 50% strength.

After passage of air for 30 seconds, the material is treated for 15 seconds at 98° C. with a solution containing per liter of water, 2.5 grams of copper sulfate. It is then rinsed hot and cold, soaped with a solution containing, per liter of water, 1 gram of a reaction product from about 10 mols of ethylene oxide and 1 mol of isododecyl phenol, and 3 grams of calcined sodium carbonate, rinsed and dried.

A bluish brown dyeing of good properties of fastness is obtained.

EXAMPLE 3

Woolen yarn is treated for 45 minutes at 55° C. at a goods-to-liquor ratio of 1:30 in the following impregnation bath and then rinsed for 5 minutes at 18° C. to 20° C. with a solution containing, per liter of water, 40 grams of sodium chloride and 3 grams of calcined sodium carbonate. The material is then allowed to drop off and treated first for 20 to 30 minutes at 18° C. and, after having heated the bath to 95° C., for 20 minutes at 95° C. in the developing bath. The yarn is then soaped for 20 minutes at 40° C. with a solution containing, per liter of water, 1 gram of a reaction product from about 20 mols of ethylene oxide and 1 mol of octadecyl alcohol and 1 cc. of ammonia of 25% strength, and then for 20 minutes at 85° C. with a solution containing, per liter of water, 1 gram of a condensation product from an aminoalkyl-sulfonic acid and a fatty acid of high molecular weight, and 0.5 cc. of acetic acid of 50% strength, rinsed and dried.

*Impregnation Bath*

1 gram of 1-(2',3'-hydroxynaphthoylamino)-2-methyl-4-chlorobenzene and
0.2 gram of sodium hydroxide are dissolved in
4 cc. of denatured ethyl alcohol,
4 cc. of water of 60° C.,
0.5 gram of a condensation product from fatty acids of high molecular weight and protein degradation products and
1 cc. of a formaldehyde solution of 30% strength. The solution so obtained is made up to 1 liter with water of 60° C.,
2.5 grams of a condensation product of fatty acids of high molecular weight and protein degradation products, and
3 grams of sodium carbonate.

*Developing Bath*

2 grams of 2-(2'-aminonaphthyl-1')-benztriazole in the form of a diazonium compound prepared in the usual manner are dissolved in
1 liter of water containing 2 grams of a reaction product from about 20 mols of ethylene oxide and 1 mol of octadecyl alcohol,
2 cc. of acetic acid of 50% strength,
10 grams of sodium acetate, and
1.75 grams of copper sulfate.

A greyish brown dyeing of good properties of fastness is obtained. When in the above example 2.1 grams of nickel sulfate are used instead of 1.75 grams of copper sulfate, a yellowish brown dyeing of same good properties of fastness is obtained.

EXAMPLE 4

Natural silk is treated for 45 minutes at 25° C. at a goods-to-liquor ratio of 1:30 in the following impregnation bath, centrifuged, and, while being wet, developed first for 15 minutes at 20° C. and then, after slowly heating to 95° C., for 20 minutes at this temperature in the developing bath. It is then rinsed, acidified with a solution containing, per liter of water, 3 cc. of hydrochloric acid of 20° Bé., rinsed again and soaped for 15 minutes at 95° C. with a solution containing, per liter of water, 5 grams of soap, rinsed and dried.

*Impregnation Bath*

3 grams of 2,3-hydroxynaphthoylaminobenzene are dissolved in
6 cc. of denatured ethyl alcohol,
1.5 cc. of sodium hydroxide solution of 38° Bé.,
3 cc. of hot water, and
1.5 cc. of a formaldehyde solution of 30% strength.

This solution is made up to 1 liter with water of 25° C., 5 grams of a condensation product from fatty acids of high molecular weight and protein degradation products, 4 cc. of sodium hydroxide solution of 38° Bé. and 10 grams of sodium chloride.

*Developing Bath*

2 grams of 2-(2'-amino-4' - methoxy-5' - benzolaminophenyl)-6-methoxybenztriazole in the form of a diazonium compound prepared in the usual manner are dissolved in 1 liter of water containing
2 grams of a reaction product from about 20 mols of ethylene oxide and 1 mol of octadecyl alcohol,
3 cc. of acetic acid of 50% strength,
10 grams of sodium acetate, and
1.75 grams of copper sulfate.

A garnet dyeing of good properties of fastness is obtained.

When in the above example 1.65 grams of cobaltous chloride or 2.1 grams of nickel sulfate are used instead of 1.75 grams of copper sulfate garnet dyeings of good properties of fastness are likewise obtained.

EXAMPLE 5

Polamide yarn is treated for 1 hour at 80 C. at a goods-to-liquor ratio of 1:20 in a solution containing, per liter of water, 1 gram of 1-(2',3'-hydroxynaphthoylamino)-2-methoxybenzene, 0.5 cc. of sodium hydroxide solution of 38° Bé., 10 cc. of denatured ethyl alcohol, 2 grams of Monopole Brilliant Oil and 0.7 gram of 2-(2'-amino-4'-methoxy-5-methylphenyl) - 6 - methylbenztriazole. The yarn is then rinsed and treated for 30 minutes at 20° C. in a solution containing, per liter of water, 2 grams of sodium nitrite and 3 cc. of hydrochloric acid of 20° Bé. The yarn is allowed to drop off and then treated in a solution containing, per liter of water, 0.5 cc. of concentrated ammonia, 2 grams of sodium acetate, 2.5 grams of copper sulfate and 6 grams of triethanolamine. The bath is slowly heated from 35° C. to 95° C. and maintained for 20 minutes at 95° C. It is then rinsed, soaped for 15 minutes at 90° C. with a solution containing, per lit of water, 1 gram of a reaction product from about 10 mols of ethylene oxide and 1 mol of isododecylphenol and 3 grams of calcined sodium carbonate, rinsed and dried.

A reddish brown dyeing of good properties of fastness is obtained.

When in the above example 2.4 grams of cobaltous chloride and 3 grams of aminoacetic acid, or 2.8 grams of nickel sulfate and 3 grams of aminoacetic acid are used instead of 2.5 grams of copper sulfate and 6 grams of triethanolamine, a red brown dyeing is obtained.

EXAMPLE 6

Polyvinyl alcohol yarn is treated for 1 hour at a temperature ranging from 90° C. to 95° C. at a goods-to-liquor ratio of 1:30 in the following solution:

1 gram of 2,3-hydroxynaphthoylaminobenzene and 0.7 gram of 2-(2'-amino-4'-acetylamino-5' - methylphenyl)-benztriazole are dissolved with 0.5 cc. of sodium hydroxide colution of 38° Bé., 5 cc. of denatured ethyl alcohol, 5 cc. of dimethylformamide and 1 cc. of hot water, and the solution is introduced into a bath containing, per liter of water, 2 grams of Monopole Brilliant Oil and 5 cc. of sodium hydroxide solution of 38° Bé.

The yarn is then rinsed and treated for 30 minutes at 65° C. in a solution containing, per liter of water, 2 grams of sodium nitrite and 3 cc. of hydrochloric acid of 20° Bé. The material is allowed to drop off and treated for 15 minutes at 95° C. with a solution containing, per liter of water, 5 grams of sodium acetate, 2 grams of a reaction product from about 10 mols of ethylene oxide and 1 mol of isododecylphenol, 2.5 grams of copper sulfate and 6 grams of triethanolamine. It is then rinsed and dried.

A brown red dyeing of good properties of fastness is obtained.

EXAMPLE 7

12.7 parts of 2-(2'-amino-4'-methoxy-5'-methylphenyl)-benztriazole are stirred with 50 parts of water and 40 parts by volume of hydrochloric acid (density 1.16). After the addition of ice, the whole is diazotized with 10 parts by volume of a 5 N sodium nitrite solution. The diazo solution so obtained is combined at 50° C. with a suspension of 15.65 parts of 1-(2',3'-hydroxynaphthoylamino)-naphthalene in a solution of 15 parts of acetic acid, 95.2 parts of sodium acetate and 1 part of a reaction product from about 20 mols of ethylene oxide and 1 mol of oleyl alcohol in 1400 parts by volume of water. After completion of the coupling, the whole is neutralized with sodium hydroxide solution, and a solution of 12.5 parts of copper sulfate and 45 parts of triethanolamine in 200 parts by volume of water is added thereto. The whole is then heated to 95° C. and treated for 2 hours at this temperature. The metalliferous dyestuff formed is suction-filtered, washed and dried. It is a dark powder.

EXAMPLE 8

A cotton fabric is padded on the foulard with the following solution and dried:

14.4 grams of β-naphthol are made into a paste with 30 grams of Monopole Brilliant Oil and 10 cc. of sodium hydroxide solution of 38° Bé., dissolved and made up to 1 liter with boiling water containing, per liter, 3 grams of a tragacanth thickening.

The dried fabric is developed for 15 to 20 minutes at 20° C. and, after slowly heating to 95° C., for 20 to 30 minutes at 90° C. to 95° C. in the developing bath described below at a long goods-to-liquor ratio. The fabric is then rinsed with a solution containing, per liter of water, 3 cc. of hydrochloric acid of 20° Bé., and soaped for 15 minutes at 60° C. with a solution containing, per liter of water, 2 grams of soap, rinsed and dried.

*Developing Bath*

1.3 grams of 2-(2'-amino-4'-methoxy-5'-methylphenyl)-benztriazole in the form of a diazonium compound prepared in the usual manner are dissolved in 1 liter of water containing 2 grams of a reaction product from about 20 mols of ethylene oxide and 1 mol of octadecyl alcohol, 1 cc. of acetic acid of 50% strength, 7 grams of sodium acetate and 1.25 grams of copper sulfate.

A garnet dyeing is obtained.

In the following table are given further components which can be used in the process of the invention and also the tints of the metalliferous azo-dyestuffs produced from these components on the fiber, which tints likewise possess good fastness properties.

| Diazo component | Coupling component | Metal | Tint |
|---|---|---|---|
| 2-(2'-amino-4',5'-diethoxyphenyl)-6-methoxybenztriazole. | 2-(2'-3'-hydroxynaphthoylamino)-naphthalene | Copper | Garnet. |
| Do | 1,(2',3'-hydroxynaphthoylamino)-2,4-dimethoxy-5-chlorobenzene. | do | Do. |
| Do | 1-(2',3'-hydroxynaphthoylamino)-2-methyl-4-chlorobenzene | do | Do. |
| Do | 1-(2',3'-hydroxynaphthoylamino)-naphthalene | do | Currant. |
| Do | 1-(2',3'-hydroxynaphthoylamino)-3-nitrobenzene | do | Bluish garnet. |
| Do | 1-(2',3'-hydroxynaphthoylamino)-2-methylbenzene | do | Currant. |
| Do | 1-(2',3'-hydroxynaphthoylamino)-4-chlorobenzene | do | Garnet. |
| Do | 1-(2',3'-hydroxynaphthoylamino)-2-methoxybenzene | do | Bluish garnet. |
| Do | 2-(2',3'-hydroxynaphthoylamino)-3-methoxydiphenylene oxide | do | Garnet. |
| 2-(2'-aminonaphthyl-1')-benztriazole | 2,3-hydroxynaphthoylaminobenzene | do | Red brown. |
| Do | 2-(2',3'-hydroxynaphthoylamino)-naphthalene | do | Do. |
| Do | 1-(2',3'-hydroxynaphthoylamino)-2,4-dimethoxy-5-chlorobenzene. | do | Do. |
| Do | 1-(2',3'-hydroxynaphthoylamino)-naphthalene | do | Do. |
| Do | 1-(2',3'-hydroxynaphthoylamino)-3-nitrobenzene | do | Do. |
| Do | 1-(2',3'-hydroxynaphthoylamino)-2-methylbenzene | do | Do. |
| Do | 1-(2',3'-hydroxynaphthoylamino)-4-chlorobenzene | do | Do. |
| Do | 1-(2',3'-hydroxynaphthoylamino)-2-methoxybenzene | do | Do. |
| Do | 2-(2',3'-hydroxynaphthoylamino)-3-methoxydiphenylene oxide | do | Do. |
| 2-(2'-amino-4'-acetylamino-5'-methylphenyl)-benztriazole. | 1-(2',3'-hydroxynaphthoylamino)-3-nitrobenzene | do | Do. |
| Do | 1-(2',3'-hydroxynaphthoylamino)-naphthalene | do | Do. |
| Do | 1-(2',3'-hydroxynaphthoylamino)-4-methoxybenzene | do | Do. |
| Do | 2-(2',3'-hydroxynaphthoylamino)-naphthalene | do | Do. |
| Do | 1-(2',3'-hydroxynaphthoylamino)-2-methoxy-4-chloro-5-methylbenzene. | do | Do. |
| Do | 1-(2',3'-hydroxynaphthoylamino)-2-methoxybenzene | do | Do. |
| Do | 1-(2',3'-hydroxynaphthoylamino)-2-methylbenzene | do | Do. |
| Do | 1-(2',3'-hydroxynaphthoylamino)-4-chlorobenzene | do | Do. |
| Do | 1-(2',3'-hydroxynaphthoylamino)-2-methyl-4-chlorobenzene | do | Do. |
| Do | 1-(2',3'-hydroxynaphthoylamino)-2-methyl-4-methoxybenzene | do | Do. |
| Do | 1-(2',3'-hydroxynaphthoylamino)-2,4-dimethoxy-5-chlorobenzene. | do | Do. |
| Do | 1-(2',3'-hydroxynaphthoylamino)-2,-5-dimethoxy-4-chlorobenzene | do | Do. |
| Do | 1-(2',3'-hydroxynaphthoylamino)-2,5-dimethoxybenzene | do | Do. |
| Do | 4,4'-bis-(2''-3''-hydroxynaphthoylamino)-3,3'-dimethoxydiphenylene. | do | Do. |
| Do | 1-(2'-hydroxycarbazole-3'-carboylamino)-4-chlorobenzene | do | Do. |
| Do | 1-(3'-hydroxydiphenyleneoxide-2'-carboylamino)-2,5-dimethoxybenzene | do | Brown. |
| Do | 1-(2',3'-hydroxynaphthoylamino)-2-ethoxybenzene | do | Red brown. |
| Do | 2-(2',3'-hydroxynaphthoylamino)-3-methoxydiphenylene oxide | do | Do. |
| Do | 1-(6'-bromo-2',3'-hydroxynaphthoylamino)-2-methoxybenzene | do | Do. |
| Do | 1-(5'-hydroxy-1',2',1'',2''-benzocarbazole-4'-carboylamino)-4-methoxybenzene. | do | Black blue. |
| Do | 1-(5'-hydroxy-1',2',1'',2''-benzocarbazole-4'-carboylamino)-2-methyl-4-methoxybenzene. | do | Currant. |
| Do | 1-(2',3'-hydroxynaphthoylamino)-2-methyl-5-chlorobenzene | do | Red brown. |
| Do | 1-(2',3'-hydroxynaphthoylamino)-2-methoxy-5-chlorobenzene | do | Do. |
| Do | 1-(2',3'-hydroxynaphthoylamino)-4-methylbenzene | do | Do. |
| Do | 1-(2',3'-hydroxynaphthoylamino)-4-ethoxybenzene | do | Do. |
| Do | 1-(3'-hydroxydiphenylene oxide-2'-carboylamino)-naphthalene | do | Brown. |
| Do | 1-(2',3'-hydroxynaphthoylamino)-2,4-dimethylbenzene | do | Red brown. |
| Do | 1-(2',3'-hydroxynaphthoylamino)-2,3-dimethylbenzene | do | Do. |
| Do | 1-(3'-hydroxydiphenylene oxide-2'-carboylamino)-2-ethoxybenzene | do | Brown. |
| 2-(2'-amino-4'-methoxy-5'-benzoylaminophenyl)-6-methoxybenztriazole. | 1-(2',3'-hydroxynaphthoylamino)-3-nitrobenzene | do | Garnet. |
| Do | 1-(2',3'-hydroxynaphthoylamino)-naphthalene | do | Currant. |
| Do | 1-(2',3'-hydroxynaphthoylamino)-4-methoxybenzene | do | Garnet. |
| Do | 2-(2',3'-hydroxynaphthoylamino)-naphthalene | do | Do. |
| Do | 1-(2',3'-hydroxynaphthoylamino)-2-methoxy-4-chloro-5-methylbenzene. | do | Do. |
| Do | 1-(2',3'-hydroxynaphthoylamino)-2-methoxybenzene | do | Do. |
| Do | 1-(2',3'-hydroxynaphthoylamino)-2-methylbenzene | do | Currant. |
| Do | 1-(2',3'-hydroxynaphthoylamino)-4-chlorobenzene | do | Garnet. |
| Do | 1-(2',3'-hydroxynaphthoylamino)-2-methyl-4-chlorobenzene | do | Currant. |
| Do | 1-(2',3'-hydroxynaphthoylamino)-2-methyl-4-methoxybenzene | do | Do. |
| Do | 1-(2',3'-hydroxynaphthoylamino)-2,4-dimethoxy-5-chlorobenzene. | do | Garnet. |
| Do | 1-(2',3'-hydroxynaphthoylamino)-2,5-dimethoxy-4-chlorobenzene. | do | Do. |
| Do | 1-(2',3'-hydroxynaphthoylamino)-2,5-dimethoxybenzene | do | Do. |
| Do | 4,4'-bis-(2'',3''-hydroxynaphthoylamino)-3,3'-dimethoxydiphenyl. | do | Currant. |
| Do | 1-(2'-hydroxycarbazole-3'-carboylamino)-4-chlorobenzene | do | Garnet. |
| Do | 1-(3'-hydroxydiphenylene oxide-2'-carboylamino)-2,5-dimethoxybenzene. | do | Brown. |
| Do | 1-(2',3'-hydroxynaphthoylamino)-2-ethoxybenzene | do | Garnet. |
| Do | 2-(2',3'-hydroxynaphthoylamino)-3-methoxydiphenylene oxide | do | Do. |
| Do | 1-(6'-bromo-2',3'-hydroxynaphthoylamino)-2-methoxybenzene | do | Do. |
| Do | 1-(5'-hydroxy-1',2',1'',2''-benzocarbazole-4'-carboylamino)-4-methoxybenzene. | do | Greenish black. |
| Do | 1-(5'-hydroxy-1',2',1'',2''-benzocarbazole-4'-carboylamino)-2-methyl-4-methoxybenzene. | do | Do. |
| Do | Terephthaloyl-bis-(1-acetylamino-2,4-dimethoxy-5-chlorobenzene). | do | Brown yellow. |
| Do | 1-(2',3'-hydroxynaphthoylamino)-2-methyl-5-chlorobenzene | do | Currant. |
| Do | 1,(2',3'-hydroxynaphthoylamino)-2-methoxy-5-chlorobenzene | do | Garnet. |
| Do | 1-(2',3'-hydroxynaphthoylamino)-4-methylbenzene | do | Do. |
| Do | 1-(2',3'-hydroxynaphthoylamino)-4-ethoxybenzene | do | Do. |
| Do | 1-(3'-hydroxydiphenylene oxide-2'-carboylamino)-naphthalene | do | Brown. |
| Do | 1-(2',3'-hydroxynaphthoylamino)-2,4-dimethylbenzene | do | Currant. |
| Do | 1,(2',3'-hydroxynaphthoylamino)-2,3-dimethylbenzene | do | Do. |
| Do | 1-(3'-hydroxydiphenylene oxide-2'-carboylamino)-2-ethoxybenzene | do | Brown. |
| Do | 1-(2'-hydroxyanthracene-3'-carboylamino)-2-methylbenzene | do | Grey green. |
| 2-(2'-amino-4'-methoxy-5'-methylphenyl)-benztriazole | 2,3-hydroxynaphthoylaminobenzene | do | Red brown. |

| Diazo component | Coupling component | Metal | Tint |
|---|---|---|---|
| 2-(2'-amino-4'-methoxy-5'-methylphenyl)-benztriazole | 1-(2',3'-hydroxynaphthoylamino)-2-methoxy-4-chloro-5-methylbenzene. | Copper | Red brown. |
| Do | 1-(2',3'-hydroxynaphthoylamino)-2-methoxybenzene. | do | Do. |
| Do | 1-(2',3'-hydroxynaphthoylamino)-2-methylbenzene. | do | Do. |
| Do | 1-(2',3'-hydroxynaphthoylamino)-2-methyl-4-chlorobenzene. | do | Do. |
| Do | 1-(2',3'-hydroxynaphthoylamino)-2-methyl-4-methoxybenzene. | do | Do. |
| Do | 1-(2',3'-hydroxynaphthoylamino)-2,5-dimethoxy-4-chlorobenzene. | do | Do. |
| Do | 1-(2',3'-hydroxynaphthoylamino)-2,5-dimethoxybenzene. | do | Do. |
| Do | 4,4'-bis-(2'',3''-hydroxynaphthoylamino)-3,3'-dimethoxydiphenyl. | do | Do. |
| Do | 1-(3'-hydroxydiphenylene oxide-2'-carboylamino)-2,5-dimethoxybenzene. | do | Do. |
| Do | 1-(2',3'-hydroxynaphthoylamino)-2-ethoxybenzene. | do | Do. |
| Do | 2-(2',3'-hydroxynaphthoylamino)-3-methoxydiphenylene oxide. | do | Do. |
| Do | 1-(6'-bromo-2',3'-hydroxynaphthoylamino)-2-methoxybenzene. | do | Do. |
| Do | 1-(5'-hydroxy-1',2',1'',2''-benzocarbazole-4'-carboylamino)-4-methoxybenzene. | do | Black blue. |
| Do | 1-(5'-hydroxy-1',2',1'',2''-benzocarbazole-4'-carboylamino)-2-methyl-4-methoxybenzene. | do | Blue black. |
| Do | 1-(2',3'-hydroxynaphthoylamino)-2-methyl-5-chlorobenzene. | do | Brown. |
| Do | 1-(2',3'-hydroxynaphthoylamino)-2-methoxy-5-chlorobenzene. | do | Do. |
| Do | 1-(3'-hydroxydiphenyleneoxide-2'-carboylamino)-naphthalene. | do | Grey brown. |
| Do | 1-(3'-hydroxydiphenylene oxide-2'-carboylamino)-2-ethoxybenzene. | do | Brown. |
| 2-(2'-amino-4'-methoxy-5'-acetylaminophenyl)-6-methylbenztriazole. | 1-(2',3'-hydroxynaphthoylamino)-2-methylbenzene. | do | Currant. |
| Do | 1-(2',3'-hydroxynaphthoylamino)-2-methyl-4-chlorobenzene. | do | Do. |
| Do | 1-(6'-bromo-2',3'-hydroxynaphthoylamino)-2-methoxybenzene. | do | Do. |
| 2-(2'-amino-4'-methoxy-5'-acetylaminophenyl)-6-chlorobenztriazole. | 1,(2',3'-hydroxynaphthoylamino)-naphthalene. | do | Do. |
| Do | 1,(2',3'-hydroxynaphthoylamino)-2-methylbenzene. | do | Do. |
| Do | 1-(2',3'-hydroxynaphthoylamino)-2-methyl-4-chlorobenzene. | do | Do. |
| Do | 1-(6'-bromo-2',3'-hydroxynaphthoylamino)-2-methoxybenzene. | do | Do. |
| Do | 1,(2',3'-hydroxynaphthoylamino)-2-methyl-5-chlorobenzene. | do | Do. |
| Do | 1,(2',3'-hydroxynaphthoylamino)-2-methyl-4-methoxybenzene. | do | Do. |
| 2-(2'-amino-4'-methoxy-5'-methylphenyl)-6-trifluoromethylbenztriazole. | 1-(2',3'-hydroxynaphthoylamino)-naphthalene. | do | Brown. |
| 2-(2'-amino-4'-methoxy-5'-methylphenyl)-6-methylbenztriazole. | 1-(2',3'-hydroxynaphthoylamino)-naphthalene. | do | Do. |
| Do | 1-(2',3'-hydroxynaphthoylamino)-2-methoxy-4-chloro-5-methylbenzene. | do | Red brown. |
| Do | 1-(2',3'-hydroxynaphthoylamino)-2,4-dimethoxy-5-chlorobenzene. | do | Do. |
| Do | Terephthaloyl-bis-(1-acetylamino-2,4-dimethoxy-5-chlorobenzene). | do | Do. |
| Do | 2-(2',3'-hydroxynaphthoylamino)-3-methoxydiphenylene oxide. | do | Do. |
| Do | 1-(2',3'-hydroxynaphthoylamino)-2-methoxy-5-chlorobenzene. | do | Do. |
| Do | 1-(2',3'-hydroxynaphthoylamino)-2-methyl-4-chlorobenzene. | do | Do. |
| Do | 1-(6'-bromo-2',3'-hydroxynaphthoylamino)-2-methoxybenzene. | do | Do. |
| Do | 1-(2',3'-hydroxynaphthoylamino)-2-methyl-5-chlorobenzene. | do | Do. |

| Diazo component | Coupling component | Tint | | |
|---|---|---|---|---|
| | | Copper-complex | Cobalt-complex | Nickel-complex |
| 2-(2'-amino-4'-methoxy-5'-methylphenyl)-benztriazole. | β-Naphthol | Garnet | Red brown | Violet. |
| Do | 2-chloro-1-naphthol | Red brown | do | Red brown. |
| Do | 4-chloro-1-naphthol | Yellowish red brown | Bluish red brown | Brownish currant. |
| Do | Resorcinol | Yellowish brown | Yellowish brown | Bluish red brown. |
| Do | 3-hydroxydiphenylene oxide | Brownish grey | Yellowish grey brown | Greenish grey brown. |
| Do | Terephthaloyl-bis-resorcinol | Brown | Bluish brown | Reddish brown. |
| Do | p-Cresol | Reddish blue grey | Yellowish grey brown | Grey brown. |
| Do | 2,6-dihydroxynaphthaline | Bluish grey brown | do | Do. |
| Do | 3-hydroxydiphenylamine | Brownish garnet | Brownish violet | Yellowish brown. |
| Do | 2-hydroxycarbazole | Brownish currant | Bluish red brown | Yellowish dark brown. |
| Do | 2,4-dihydroxybenzophenone | Yellowish brown | Bluish grey brown | Yellowish red brown. |
| Do | 3-hydroxycarbazole | Grey brown | Bluish red brown | Khaki. |
| Do | p-Chlorophenol | Reddish grey blue | Yellowish grey brown | Brownish grey. |

EXAMPLE 9

297 parts of 2-(2'-amino-4'-acetylamino-5'-methylphenyl)-benztriazole-1-oxide are suspended in 3000 parts by volume of methanol and the suspension is treated at 85° C. and a pressure of 60 atmospheres with hydrogen, in the presence of 30 parts of Raney nickel, in an autoclave provided with stirrer. The hot solution is freed from the catalyst by suction-filtration; on cooling, the 2-(2' - amino-4'-acetylamino-5'-methylphenyl)-benztriazole crystallizes in the form of small yellow needles. By concentrating the mother liquor, a second fraction is obtained. The product is filtered off with suction, washed and dried. After recrystallization from ethyl alcohol, the compound melts at a temperature ranging from 220° C. to 221° C.

The amine obtainable as described in the present example can be coupled according to the process of the present invention and the dyestuff so obtained can be treated with agents yielding metal.

We claim:
1. A water-insoluble complex metal compound containing a metal selected from the group consisting of cobalt, copper, and nickel, of an azo-dyestuff having the following general formula

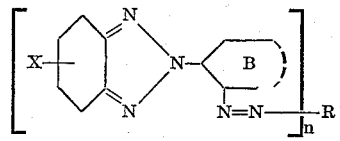

wherein X represents a member selected from the group consisting of hydrogen, chlorine, methyl, methoxy and trifluoromethyl, B represents a radical selected from the group consisting of the benzene and napthalene series, R represents the radical of a coupling component selected from the group consisting of arylamides of 2,3-hydroxynaphthoic acid, 6-bromo-2,3-hydroxynaphthoic acid, 2-hydroxyanthracene-3-carboxylic acid, 3-hydroxydiphenylene oxide-2-carboxylic acid, 2-hydroxycarbazole-3-carboxylic acid and 5-hydroxy-1,2,1',2'-benzocarbazole-4-carboxylic acid, the arylamide radical being selected from the group consisting of the benzene, naphthalene, diphenyl and diphenylene oxide series, and $n$ represents one of the integers 1 and 2.

2. The complex copper compound of the azo-dyestuff having the formula

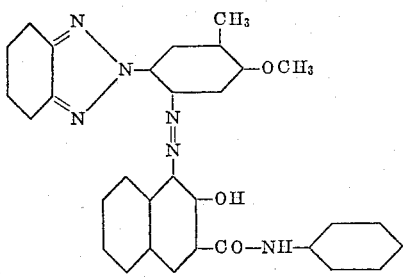

3. The complex copper compound of the azo-dyestuff having the formula

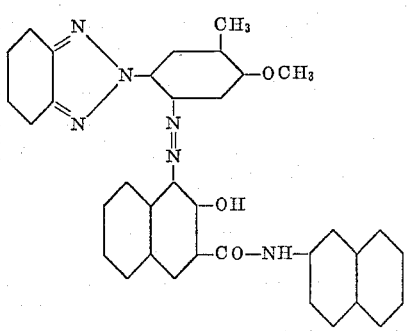

4. The complex copper compound of the azo-dyestuff having the formula

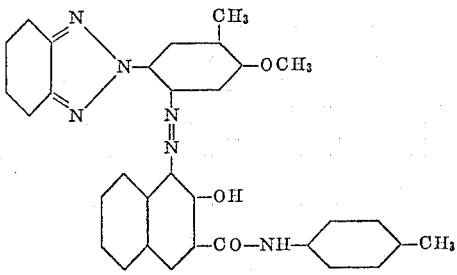

5. The complex copper compound of the azo-dyestuff having the formula

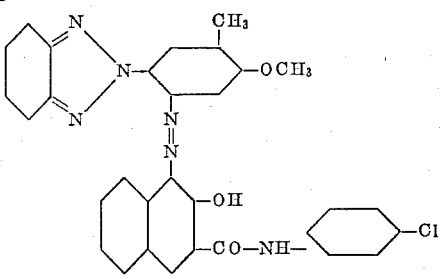

6. The complex copper compound of the azo-dyestuff having the formula

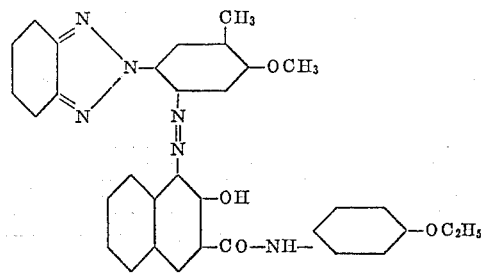

References Cited in the file of this patent

UNITED STATES PATENTS

| | | |
|---|---|---|
| 1,667,667 | Laska et al. | Apr. 24, 1928 |
| 2,109,552 | Schindhelm | Mar. 1, 1938 |